United States Patent [19]

Suzuki et al.

[11] Patent Number: 4,650,988
[45] Date of Patent: Mar. 17, 1987

[54] IMAGE READING APPARATUS WITH AN AREA-TYPE BEAM SPLITTER

[75] Inventors: Takashi Suzuki, Yokohama; Susumu Matsumura; Nozomu Kitagishi, both of Kawasaki, all of Japan

[73] Assignee: Canon Kabushiki Kaisha, Tokyo, Japan

[21] Appl. No.: 283,001

[22] Filed: Jul. 13, 1981

[30] Foreign Application Priority Data

Jul. 17, 1980 [JP] Japan ................................. 55-98524

[51] Int. Cl.⁴ .............................................. H01J 3/14
[52] U.S. Cl. .................................... 250/216; 250/578; 250/204
[58] Field of Search ............... 250/201, 204, 216, 578; 354/25 R; 350/162.2, 162.23, 162.24, 162.12, 162.22

[56] References Cited

U.S. PATENT DOCUMENTS 4,349,254  9/1982  Jyojiki et al. ..................... 354/25
4,352,545  10/1982  Uno et al. ........................ 250/204

Primary Examiner—David C. Nelms
Attorney, Agent, or Firm—Fitzpatrick, Cella, Harper & Scinto

[57] ABSTRACT

An area-type beam splitter is disposed across the optical path of an imaging optical system. Photodetector arrays are located across the optical path portions divided by the beam splitter. The photodetector arrays in the respective optical path portions are arranged in different positions from one another in such a manner that images different from one another in imaging performance will be read by the respective photodetector arrays.

7 Claims, 10 Drawing Figures

IMAGE READING APPARATUS WITH AN AREA-TYPE BEAM SPLITTER

BACKGROUND OF THE INVENTION

1. Field of the Invention

This invention relates to an image reading apparatus, and more paticularly an apparatus for reading at least two images different in optical path length from each other which are formed on a plurality of sensors located substantially in the same plane by dividing a light beam from an objective lens in a beam splitter.

2. Description of the Prior Art

Image reading apparatuses of such a type are applicable to a focus state detecting means for cameras. Such a focus state detecting means serves to detect images which have been focused. In order to obtain proper information in the sensors, therefore, it is necessary to divide the imaging light beam while maintaining the imaging performance thereof.

The prior art beam splitters which are required to maintain their imaging performances after dividing are mostly of such an amplitude dividing type that a semi-permeable membrane of dielectric material is deposited on a glass substrate. When a single layer of such a semi-permeable membrane is actually used, however, the light beam is divided under substantially adverse influence with respect to polarization and color characteristics. Accordingly, the prior art is in such a state that acceptable characteristics are hardly maintained by using a multi-layered membrane, normally including 10 to 20 layers.

SUMMARY OF THE INVENTION

It is therefore an object of this invention to provide an image reading apparatus for properly detecting information of objects, which can easily be manufactured and which can divide and conduct an imaging light beam to sensor arrays disposed in or adjacent to a predetermined image plane of an imaging optical system and composed of a plurality of photoelectric converting elements and cannot yet affect the divided light beam portions in imaging performance, particularly, in polarization and color characteristics.

According to this invention, this object can be accomplished by utilizing an area type, that is, a wavefront division type of beam splitter.

The area type of beam splitter is known per se. For example, Laid-Open Japanese Patent Application No. 119,030/1978 discloses a reflecting mirror means in which an incident light is divided by an area-type beam splitter into two light portions one of which is reflectively conducted to an optical system in a view finder, the other light portion being transmissively conducted to a light-metering photoreceptive element. Such a reflecting mirror means splits the incident light merely for metering a mean intensity in the incident beams from a photographing lens and does not take into account maintaining the imaging performance in the divided light beams. This is completely distinguished from such a focus state detecting device that is adapted to divide an imaging light beam while maintaining the imaging performance thereof available for detecting image information. Rather, the prior art intends to balance the light beams by carrying out an averaged light metering through photoreceptor means which are disposed on a non-imaging plane.

On the contrary, this invention provides an image reading apparatus for dividing an incident light beam to form light beam portions which can be utilized to detect high resolution image information available for focus detection. This is apparently different from the meterage of an incident light beam. According to this invention, a photoreceptor section consisting of a plurality of separated photoelectric converting elements is located in or adjacent to a predetermined image plane of an imaging optical system for reading image information, and an area type of beam splitter is applied for dividing the imaging light beam. Such an arrangement provides an excellent advantage in that it can overcome the hereinafter described problem inherent in a sensor array for detecting image information, in comparison with the prior art which has metered only the intensity in the incident light with a single photoelectric converting element and has utilized an amplitude division type of beam splitter.

Reading an object image, a sensor array cannot precisely resolve spatial frequency components not less than Nyquist frequency which is defined by a spatial frequency $2Ps$ of twice the spatial frequency $Ps$ in a pitch (sensor pitch) between the separated photoelectric converting elements in the sensor array. If any image having such a higher spatial frequency component is incident on the sensor array, a wrong signal would be produced by the sensor array, obstructing the correct reading of image information. It is thus customary that the conventional imaging optical system includes a so-called low-pass filter located therein for shutting off any spatial frequency component higher than the above Nyquist frequency $2Ps$. However, the area-type beam splitter utilized in this invention can function also as a low-pass filter, distinguished from the beam splitter of dielectric membrane type. Consequently, this invention provides a very superior advantage in that such a low-pass filter is not required in the imaging optical system. Thus, the area-type beam splitter is particularly advantageous for the sensor array.

DESCRIPTION OF THE PREFERRED EMBODIMENTS

Figures 1A, 1B, 1C:
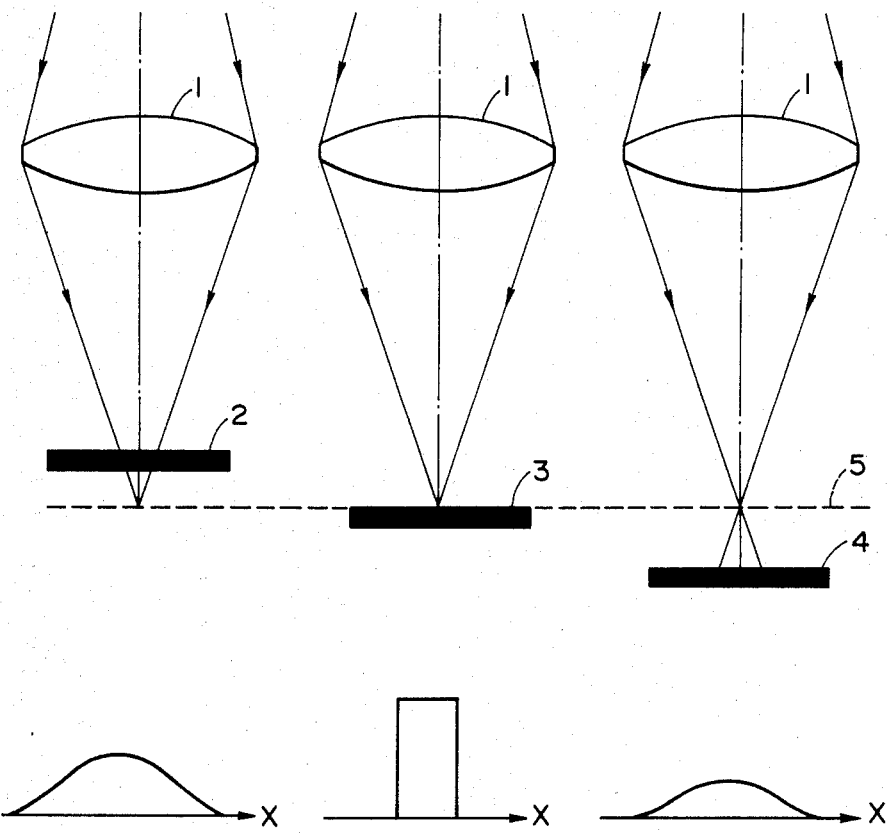
FIGS. 1A, 1B and 1C are diagrammatic views illustrating an outline of an focus state detecting means.

Preferred embodiments which will be describe hereinafter are some examples in which this invention is applied to a focus state detecting device for cameras such as that disclosed in Laid-Open Japanese Patent Application No. 18,652/1980 assigned to the applicant. FIG. 1 is a diagrammatic view for explaining the outline of the above focus state detecting device prior to the description of the optical sections particularly concerning this invention. When focused, an imaging optical system 1 forms an image of an object (not shown) on a predetermined image plane 5. A sensor array 2 made of CCD or the like is disposed forward close to the predetermined image plane 5, a sensor array 3 is located just at the predetermined image plane 5 and a sensor array 4 is positioned rearward close to the predetermined image plane 5. These sensor arrays are respectively adapted to output electrical time series signals represented by the respective distributions of illumination which correspond to the forward deviating image, the clearly focused image and the rearward deviating image as diagrammatically shown in FIGS. 1A, 1B and 1C. Basing on the information obtained from these three sensor arrays, the formed image can be detected whether it is in the focus, front-focus or rear-focus state. The procedure with respect to this detection is described in detail in said Japanese Patent Disclosure No. 18,652/1980. As described also in this Patent Disclosure, the number of the sensor arrays is not limited to three. For example, such a detection may be accomplished only by two sensor arrays which are disposed forward and rearward close to the image plane.

Figure 2:
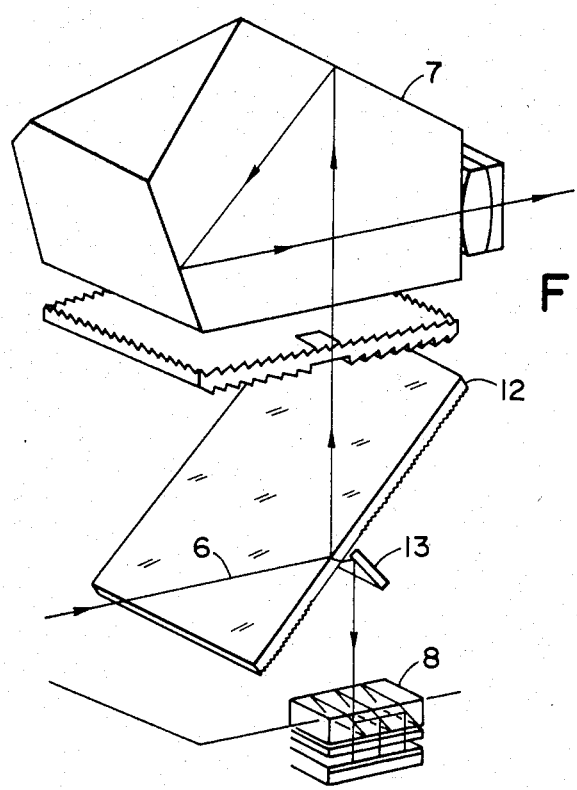
FIGS. 2 and 3 are schematic views illustrating the first embodiment of this invention which is assembled into a single lens reflex camera.
Figure 3:
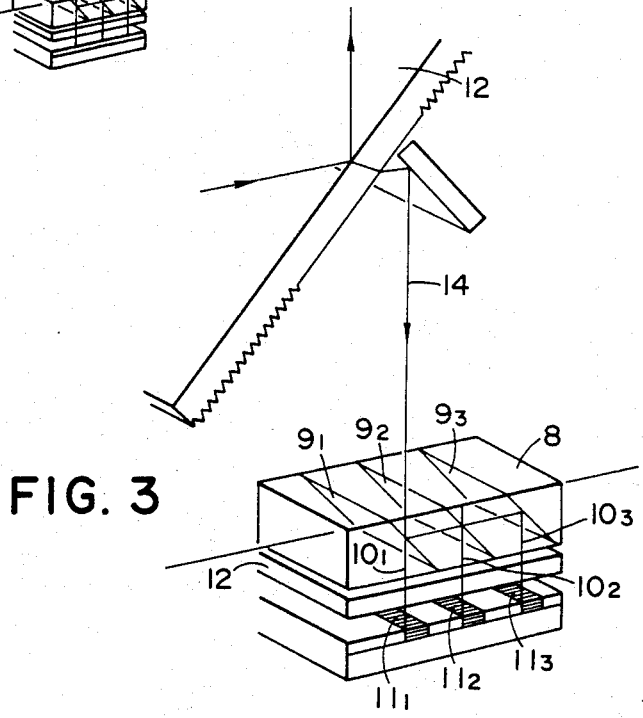

FIG. 2 shows the interior of a camera to which this invention is applied, and FIG. 3 is a view showing, in an enlarged scale, part of the internal camera components. This camera is shown by its cross-section passing through a plane including the optical axis for clarification.

In FIGS. 2 and 3, an imaging light beam 6 from an imaging optical system (not shown) is incident on a quick return mirror 12 whereat part of the beam is transmitted through the semi-transparent mirror surface of the quick return mirror 12 with the remaining beam portion being reflected by the same surface to a view finder system. The back face of the quick return mirror 12 is provided with a light screen layer for blocking any light other than the light beam toward a mirror 13. The light beam is then incident on the mirror and reflected by the same to form an imaging light beam 14 which will be then incident on a fine-beam splitter section 8 disposed below for detecting the focus state.

In FIG. 3, the imaging beam 14 divided by the beam splitter 12 is then incident on an area-type beam splitter $9_1$ and again divided by the same. The reflected beam from the beam splitter $9_1$ is divided by another area-type beam splitter $9_2$ with part of the divided beam being transmitted therethrough to the conventional mirror $9_3$. This beam portion is reflected by the mirror $9_3$. Thus, three imaging light beams $10_1$, $10_2$ and $10_3$ are formed to be incident on three CCD line sensors $11_1$, $11_2$ and $11_3$, respectively.

Figure 4:
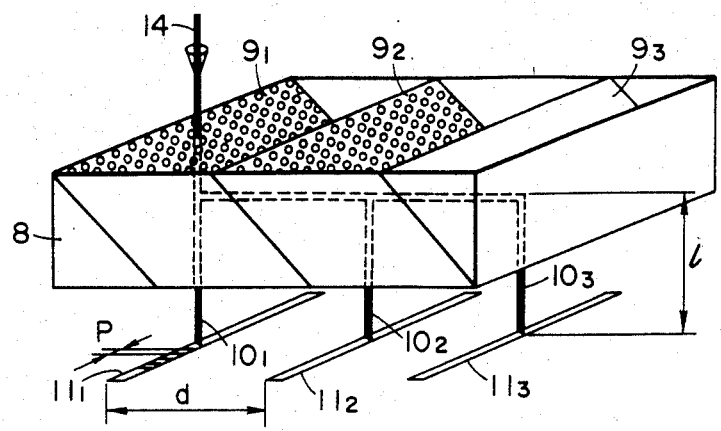
FIG. 4 is a view showing a light dividing device which is used in the first embodiment of this invention and provided with an area-type beam splitter.

FIG. 4 is an enlarged view of the fine-beam splitter 8 which is made of a transparent material such as LASF$_{016}$ having a refractive index nd=1.772, BK7 having a refractive index nd=1.516 or the like and within which the beam splitters $9_1$, $9_2$ and the conventional mirror $9_3$ are located.

The transparent material of the fine-beam splitter section is selected such that its refractive index is adapted to adjust the optical path difference (defocusing degree) in the imaging light beams which are incident on the respective sensors $11_1$, $11_2$ and $11_3$.

With respect to the deviation of image for causing the respective sensor to detect the focus state, it is desirable that the converted-in-air optical path differences (actual optical-path length divided by the refractive index of a medium) between the imaging beams $10_1$, $10_2$ and between the imaging beams $10_2$, $10_3$ are in the range of 0.2–1.0 mm, depending upon the logic of the focus state detecting system and the kind of the used and exchanged lenses. Correspondingly, the spacing d between each adjacent line sensors is determined to be in the range of about 0.5–2.0 mm.

A distance 1 from each sensor to such a position that each of the imaging light beams $10_1$, $10_2$ and $10_3$ is incident on the surface of the respective beam splitter $9_1$, $9_2$ or $9_3$ is in the range of 1–2 mm under the converted-in-air optical path length. A pitch P between each adjacent segments of the CCD line sensors $11_1$, $11_2$ and $11_3$ is in the order of about 30 $\mu$m.

In such an arrangement of the fine-beam splitter section, each of the area-type beam splitters $9_1$ and $9_2$ (randomly dotted mirror) is located at an angle of 45 degrees relative to the sensor surface as shown in FIG. 4 and includes a plurality of small circle transmitting portions which are randomly arranged thereon. The transmissive light quantity T in the randomly dotted mirror $9_1$ is in the order of 33%±2% by simply calculating a ratio of areas between the transmissive and reflective portions when the mirror surface is scanned by an imaging beam corresponding to F5.6–F8 in such a direction that the sensors are arranged. Similarly, the transmissive light quantity T in the randomly dotted mirror $9_2$ is designed to be in the order of 50%±3%. Strictly, the area ratio is determined while taking into account the absorption property of the reflective membrane, the distribution of intensity in the dotted images and other factors.

The small circles are randomly arranged because the deformation of the dotted images is prevented from increasing due to the diffraction, no moire is produced by the patterns of two transmissive light beams which are incident on the area-type mirror as shown in FIG. 4, or a predetermined ratio or uniformity in intensity between the sensors when the sensor surfaces are illuminated by a uniform light beam is prevented from varying. If the dotted arrangement is too random, however, the sensor surfaces would be irregularly illuminated. Thus, the random dots must be evenly distributed.

It is also desirable that the minimum diameter of each light-transmissive or reflective portion shown in FIG. 4 by a small circle on the beam splitting surface of the area-type beam splitter is on an average in the range of 1/100 to 1/10 where l is a converted-in-air optical path length between the beam splitter and the sensor surface. If the above minimum diameter is less than 1/100, the modulation transfer function (MTF) in the divided beam would be decreased greatly. On the contrary, if the minimum diameter of the light-transmissive or reflective portion is more than 1/10, the uniformity in images would be adversely affected when a lens of F5.6 or F8 is used to form narrowed light beams for imaging the dots. In our experiments, it has been found that an optimum value for balancing the MTF values with the uniformity is about 1/30 for the forward sensor.

In such a manner, the focus state can be determined by dividing the incident beam 14 in the area-type beam splitters $9_1$, $9_2$ and conducting the divided imaging beam portions $10_1$, $10_2$ and $10_3$ toward the CCD line sensors $11_1$, $11_2$ and $11_3$ wherein the deviations in the respective images are detected as shown in FIG. 1. In order to exactly determine the focus states, each of the beam splitters is required to provide a light quantity ratio of about 1:1:1 in the three imaging light beams $10_1$, $10_2$ and $10_3$ and to provide no difference in the color and polarization characteristics. Such a requirement can be satisfied by the area-type beam splitters which are inexpensively maufactured in comparison with any semi-transparent mirror of dielectric material.

This invention can be applied to a focus indicator system. When a focus state is detected by any deviation in an image in such a focus indicator system, it is preferred that the MTF in the imaging optical system leading to the respective sensors $11_1$, $11_2$ and $11_3$ be balanced. This is because it is preferred that the focus states are detected by comparing the integrated values of the differences in the outputs between each adjacent segments in the respective sensors.

Figure 7:
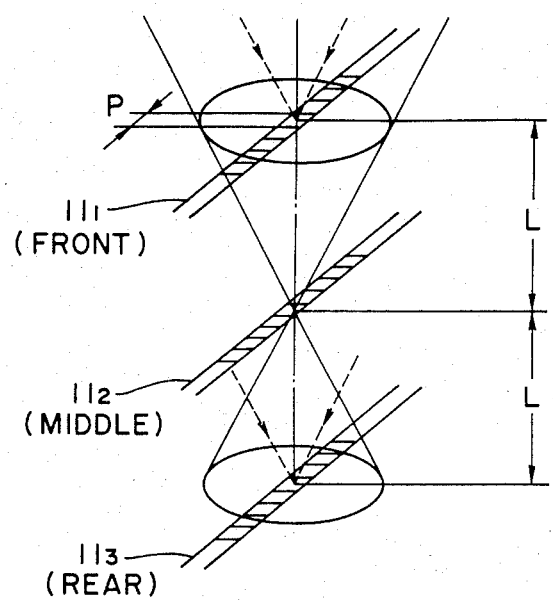
FIG. 7 is a view which is optically equivalent to FIGS. 4, 5 and 6.

MTF has been calculated with respect to an optical system utilizing the fine-beam splitter section 8 shown in FIG. 4. In this connection, the diameter of one small circle transmissive portion on the area-type beam splitter $9_1$ is about $20\mu$ whereas the diameter of one small circle on the beam splitter $9_2$ is about $25\mu$. If this optical system is replaced by an equivalent optical system as shown in FIG. 7, and supposing that the beam splitters $9_1$ and $9_2$ are located on the optical axis at a position perpendicular to the optical axis and spaced by a predetermined distance from the associated sensors, MTF values in a direction toward the sensors upon forming images on the respective sensors indicate such results as shown by three curves which are shown generally by A in the lower portion of a graph in FIG. 8. In this graph, a broken line shows MTF values only in the imaging lens, and the words "FRONT", "MIDDLE" and "REAR" designate MTF values of the light beams which form images on the sensors $11_1$, $11_2$ and $11_3$ shown in FIG. 7 after passed through the imaging lens and the beam splitters, respectively. Where a pitch in the CCD sensors is P, Nyquist frequency (an upper limit frequency to which the sensors can properly response) is represented by the following formula:

$$f_H = \tfrac{1}{2}P(\text{number/mm}).$$

Figure 8:
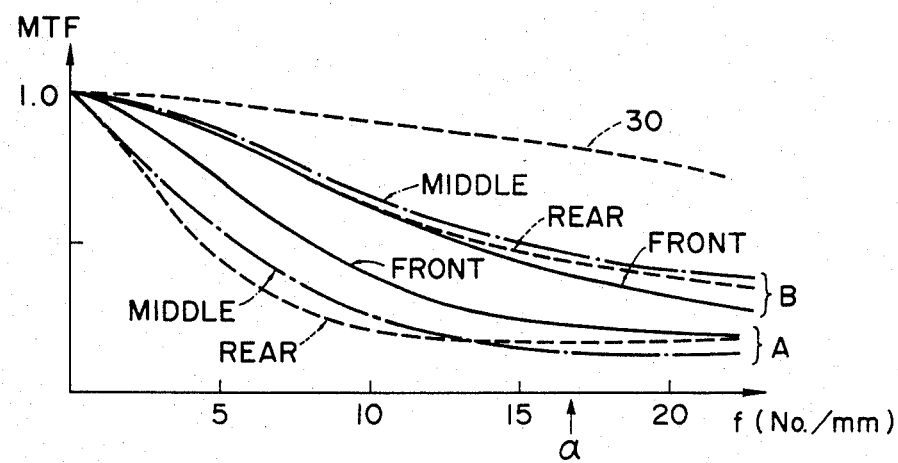
FIG. 8 is a view showing modulation transfer functions in the first and second embodiments of this invention.

In FIG. 8, therefore 20 number/mm on the horizontal scale corresponds to a Nyquist frequency when a pitch P in the sensor is $25\mu$, and 15 number/mm corresponds to a Nyquist frequency when P is $33.3\mu$. A Nyquist frequency in the sensor having its pitch of $30\mu$ is indicated by $\alpha$.

As can seen from this graph, any spatial frequency component exceeding the Nyquist frequencies can be shut off by using an area-type beam splitter to maintain its MTF value low so that wrong signals will not be blended much in the image signals from the CCD line sensors. It is ideally desirable that the MTF values up to the Nyquist frequency are in the order of one (1) and the Nyquist values in the frequencies exceeding the Nyquist frequency are in the order of zero (0). It is actually difficult to prepare an area-type beam splitter having such a characteristic. If a MTF value at the Nyquist frequency in an area-type beam splitter is completely zero, it is general that MTF values at lower frequencies also are inconveniently held low. In the present embodiment, accordingly, the MTF value at the Nyquist frequency is in a predetermined value exceeding zero.

In the actual operation for the combination of the area-type beam splitters $9_1$ and $9_2$, it has been found that there is a problem in that the total MTF is too low for detecting the focus state to deteriorate the respective balances between the sensors $11_1$, $11_2$ and $11_3$. However, such a problem can be overcome by the second embodiment of this invention which is shown in FIG. 5 and will now be described.

Figure 5:
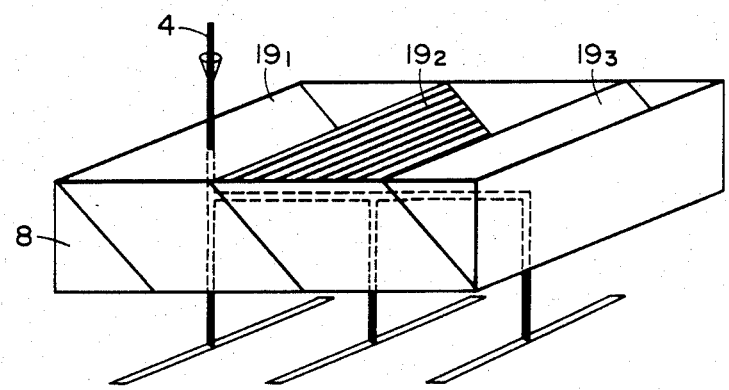
FIGS. 5 and 6 are views showing light dividing devices used in the second and third embodiments of this invention, respectively.

Similarly, a fine-beam splitter section shown in FIG. 5 includes area-type beam splitters $19_1$, $19_2$ and a mirror $19_3$ all of which are located in a prism of a transparent material as in the first embodiment shown in FIG. 4. The area type beam splitter $19_1$ includes light-transmissive portions in the form of a small circle having a diameter o $45\mu$. These small circle portions are arranged in a "para-random" manner. Namely, the small circles are arranged in a random pattern in a light beam of F5.6 and on the other hand such a random pattern is periodically repeated with a pitch corresponding to the width of the above light beam. The diameter of the small circle is two times that of the beam splitter shown in FIG. 4 so that MTF values will be maintained at very high level as seen from curves shown by B in FIG. 8. The embodiment of FIG. 5 provides a second improvement by the fact that the second area-type beam splitter $9_2$ is in the form of a striped mirror. This striped mirror has a stripe pitch of $40\mu$ and openings (light-transmissive portions) each having a width of $20\mu$. Each stripe is oriented longitudinally of the sensors, that is, in a direction that the photoelectric converting elements are arranged. As a result, the MTF values of the second beam splitter $19_2$ in the sensor direction will not be decreased so that the dispersion in the MTF values for the respective sensors can be maintained very low resulting in an excellent characteristic for detecting the focus state. Although the stripes are periodically disposed in this embodiment, they may be arranged to have such a random-pitch and width that an average transmission factor can be satisfied.

The aforementioned area-type beam splitters can be manufactured by either of two methods depending upon the magnitude of the respective pattern without producing any problem in the polarization and color characteristics. One of these methods is such a photofabrication that has been used to make integrated circuits and the like and that can be utilized to accomplish the light-transmissive portions of such a pattern as has a line width of 0.1 mm or less. The other method is a mask deposition which can be utilized to provide a pattern having the line width more than about 0.1 mm. In the mask deposition, a mask of metal sheet having openings formed therethrough along a pattern to be used is placed closely on a glass substrate to deposit a metal material such as aluminium or the like on the glass substrate through the openings of the mask. The metal sheet has a thickness in the range of 0.05 mm–0.1 mm. This mask deposition improves the manufacturing cost for beam splitters, but is somewhat reduced in precision.

In the embodiments shown in FIGS. 4 and 5, it has been found that a beam splitting section consisting of the silver-deposited beam splitter $9_1$, the aluminium-deposited beam splitter $9_2$ and the aluminium-deposited mirror $9_3$ provides a somewhat better color characteristic (a balance in spectral transmission factor under the wavelength of the light incident on each sensor), in comparison with another beam splitting section having the same components except that all of them are deposited with aluminium.

In other words, it is preferred that the beam splitter $9_1$ is deposited with silver if the color characteristic is considered to be important. However, silver has a poor weatherability or durability. Where the mirror portion shown by black color in FIG. 4 is exposed at the end face of the prism, a corrosion beings at this end face and gradually advances toward the interior of the prism. In the worst case, the glass prism would be disassembled under such a corrosion. It is therefore desirable that the mirror portion is not connected with the prism and that the small circles are used as light-reflective portions. In this case, however, the reflective circles must be arranged closer to one another for maintaining the reflection factor of the area-type beam splitter $9_1$ at 66.6% so that they will be substantially regularly arranged since there is no space for the random arrangement.

Figure 6:
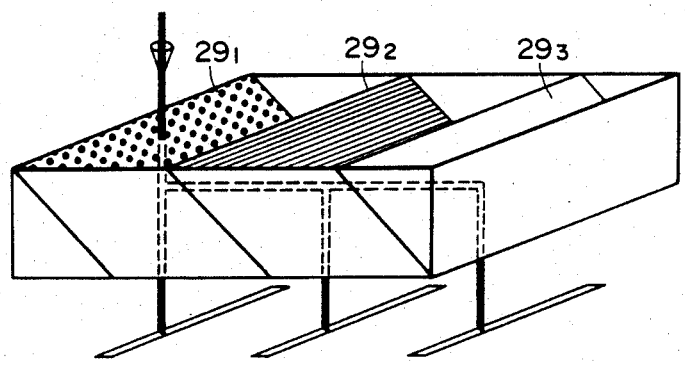

This is shown by an embodiment of FIG. 6 in which an area-type beam splitter $29_1$ having small circle mirrors each of which has a diameter of 90μ are regularly arranged. An area-type beam splitter $29_2$ is similar to that of FIG. 5 in stripe pitch. As a result, MTF values are substantially similar to those of the prism shown in FIG. 5, but the uniformity in the sensor direction is decreased resulting in a periodical irregularity of about ±10% as scanning by the light beam of F5.6.

Various patterns on the area-type mirror can be considered. If it is only required to split an incident beam into two divided beams, a pattern can easily be designed by providing an estimated program for MTF values. When the area-type beam splitters are placed one on another as shown in FIGS. 4 to 6, however, it is preferred that a periodical pattern is not provided for avoiding any moire. In the embodiment shown in FIG. 6, an average diameter in the transmissive or reflective portion is similarly in the range of 1/100 to 1/10 as in the previous embodiments.

Although some typical area-type beam splitters for delivering imaging light beams to a plurality of CCD sensors have been described, various changes can be made with respect to the concrete configuration of the beam splitters if the MTF values and the uniformity therein can be ensured to accomplish the object of this invention.

What we claim is:

1. An image reading apparatus, comprising;
an objective lens;
a plurality of sensor arrays disposed substantially on the same plane; and
a beam splitter disposed between said objective lens and said sensor arrays, said beam splitter having at least one area-type beam splitting surface and a surface for orienting at least one of the split beams toward said sensor arrays.

2. An image reading apparatus as defined by claim 1, wherein said beam splitting surface is composed of a pattern having a plurality of light-transmissive and reflective portions arranged therein, each of said plurality of light-transmissive portions having a minimum average width which is in the range of 1/100 to 1/10, inclusive, where l is a converted-in-air optical path length between said beam splitting surface and said sensor arrays.

3. An image reading apparatus as defined by claim 1, wherein said beam splitting surface is composed of a pattern having a plurality of light-transmissive and reflective portions arranged therein, each of said plurality of reflective portions having a minimum average width which is in the range of 1/100 to 1/10, inclusive, wherein l is a converted-in-air optical path length between said beam splitting surface and said sensor arrays.

4. Apparatus for use in a range determination system having a primary lens for directing radiation from a remote object along a path to radiation responsive means operable in accordance with the distribution of the radiation to determine the range to the object, the radiation distribution containing high spatial frequency components which may cause undesirable operation of the system comprising:
radiation filter means mounted in the path and operable to suppress the high spatial frequency components.

5. Apparatus according to claim 4 wherein the filter has an uneven surface which causes the radiation to deflect at a predetermined angle to the path.

6. Apparatus according to claim 5 wherein the uneven surface is a diffraction grating.

7. Apparatus according to claim 5 wherein the uneven surface is a controlled irregular surface.

* * * * *

UNITED STATES PATENT AND TRADEMARK OFFICE
CERTIFICATE OF CORRECTION

PATENT NO. : 4,650,988                              Page 1 of 2
DATED      : March 17, 1987
INVENTOR(S): TAKASHI SUZUKI, ET AL.

It is certified that error appears in the above-identified patent and that said Letters Patent is hereby corrected as shown below:

COLUMN 2

Line 44, "an" should read --a--.
    Line 62, "describe" should read --described--.

COLUMN 5

Line 4,  "maufactured" should read --manufactured--.
    Line 47, "can seen" should read --can be seen--.

COLUMN 6

Line 9,  "o" should read --of--.
    Line 48, "aluminium" should read --aluminum--.
    Line 55, "aluminium-" should read --aluminum- --.
    Line 56, "aluminium-deposited" should read
            --aluminum-deposited--.

UNITED STATES PATENT AND TRADEMARK OFFICE
CERTIFICATE OF CORRECTION

PATENT NO. : 4,650,988
DATED : March 17, 1987
INVENTOR(S) : TAKASHI SUZUKI, ET AL.

It is certified that error appears in the above-identified patent and that said Letters Patent is hereby corrected as shown below:

COLUMN 6

Line 63, "aluminium." should read --aluminum--.

Signed and Sealed this

Fifteenth Day of September, 1987

Attest:

DONALD J. QUIGG

Attesting Officer     Commissioner of Patents and Trademarks